(12) United States Patent
Kimmel

(10) Patent No.: US 8,267,049 B2
(45) Date of Patent: Sep. 18, 2012

(54) CLAWMINATOR SYSTEMS

(76) Inventor: Candice June Kimmel, Sturgis, SD (US)

( * ) Notice: Subject to any disclaimer, the term of this patent is extended or adjusted under 35 U.S.C. 154(b) by 124 days.

(21) Appl. No.: 12/750,892

(22) Filed: Mar. 31, 2010

(65) Prior Publication Data

US 2011/0036303 A1    Feb. 17, 2011

Related U.S. Application Data

(60) Provisional application No. 61/274,223, filed on Aug. 14, 2009.

(51) Int. Cl.
*A01K 15/02*    (2006.01)
(52) U.S. Cl. .................. 119/706; 119/621; 119/702
(58) Field of Classification Search ............ 119/706, 119/702, 621, 623, 609, 610; 132/76.4, 76.5
See application file for complete search history.

(56) References Cited

U.S. PATENT DOCUMENTS

| 2,997,019 | A | | 8/1961 | Bryson | |
|---|---|---|---|---|---|
| 3,993,027 | A | | 11/1976 | Mullin | |
| 5,564,365 | A | | 10/1996 | Kacic | |
| 5,595,141 | A | | 1/1997 | Udelle et al. | |
| 6,490,996 | B1 | | 12/2002 | Terry | |
| 6,619,237 | B2 | * | 9/2003 | Robertson | 119/706 |
| 2002/0189549 | A1 | * | 12/2002 | Writer et al. | 119/706 |
| 2007/0089686 | A1 | | 4/2007 | Drelinger | |
| 2008/0078334 | A1 | * | 4/2008 | Zaiko | 119/702 |

* cited by examiner

*Primary Examiner* — Rob Swiatek
*Assistant Examiner* — Lisa Tsang
(74) *Attorney, Agent, or Firm* — RG Patent Consulting LLC; Rachel Gilboy

(57) ABSTRACT

A cat claw trimming and exercise device permitting a cat to physically exercise both its legs and trim its claws simultaneously. The cat claw trimming and exercise device comprises a vertical post, a flat base, and a sandpaper cartridge. The flat base has a textured surface permitting a cat to stabilize itself using its back legs while using the device. The sandpaper cartridge is removably installable and has a cardboard tube with a hollow inner volume and a surface coating. Further, a kit is disclosed comprising: a replaceable sandpaper cartridge, a user instruction manual, and a cat claw trimming and exercise device. A method of use is also disclosed for using the present invention.

10 Claims, 5 Drawing Sheets

CLAWMINATOR SYSTEMS

CROSS-REFERENCE TO RELATED APPLICATION

The present application is related to and claims priority from prior provisional application Ser. No. 61/274,223, filed Aug. 14, 2009 which application is incorporated herein by reference.

BACKGROUND OF THE INVENTION

1. Field of the Invention

The present invention relates generally to the field of cat scratching posts and more specifically relates to a cat claw trimming and exercise device.

2. Description of the Related Art

Scratching may be a healthy, natural, and instinctual behavior for cats. Claws may be vital tools that are used by cats everyday for balancing and walking on a complete paw, communicating, scratching, grooming, catching and grasping toys, as well as raking and negotiating litter. Additionally, claws are a cat's main means of security, safety, and self-defense. Further claws may save the life of an indoor cat that accidentally gets out of the house and suddenly has to defend themselves outdoors or may have to hunt for food to survive.

Unfortunately, if indoor cats don't have appropriate places to satisfy their natural and healthy scratching tendencies, they may use furniture, doors, and/or walls, thereby ruining such objects. For the few cats that are more stubborn and a bit harder to train, there are potential solutions that work like covering their claws with soft paws or covering the furniture ends with sticky paws.

Another optional apparatus a cat owner may use to prevent their cat from damaging furniture, walls, and doors is to provide a scratching post(s). A scratching post is typically a wooden post covered in rough material that provides the pet with an acceptable place to scratch. Cats instinctively have a natural urge to scratch: the action helps them remove material from inside their claws, and to mark their 'territory' using scent glands in their paws. Unfortunately, indoor cats may also not receive adequate exercise, due to their confined living space. A need exists for a means to promote their healthy scratching action, and yet to reduce damage to a homeowner's belongings.

Traditional scratching posts may be ineffective as currently manufactured. Materials used to construct these posts may include carpet or honeycomb cardboard, which does not contribute in any way to the trimming of cats' claws. Additionally, claws on cats require on-going maintenance because the claws continuously grow throughout a cat's lifetime.

Various attempts have been made to solve the above-mentioned problems such as those found in U.S. Pat. Nos. 6,490, 996, 5,564,365, 2,997,019, 2007/0089686, and 5,595,141. This prior art is representative of cat claw trimming. However, none of these patents provide multi-function scratching posts to permits a cat to physically exercise both its legs and trim its claws simultaneously. Furthermore, none of the above inventions and patents, taken either singly or in combination, is seen to describe the invention as claimed.

Ideally, a cat claw trimming and exercise device and system should permit a cat to both physically exercise its legs and trim its claws simultaneously and, yet operate efficiently and be manufactured at a modest expense. Further, the cat claw trimming and exercise device should be aesthetically pleasing, enticing to cats to use and be easy to operate. Thus, a need exists for a cat claw trimming and exercise device to avoid the above-mentioned problems.

BRIEF SUMMARY OF THE INVENTION

In view of the foregoing disadvantages inherent in the known cat claw trimming art, the present invention provides a novel clawminator system, cat claw trimming and exercise device. The general purpose of the present invention, which will be described subsequently in greater detail is to provide a cat claw trimming and exercise device permitting a cat to physically exercise both its legs and trim its claws simultaneously.

The present cat claw trimming and exercise device disclosed herein preferably comprises the following components: a vertical post, a flat base, and at least one removable sandpaper cartridge. The flat base may have a textured surface thereby permitting at least one cat to stabilize themselves using their back legs while performing claw trimming and exercising.

The sandpaper cartridge may have a cardboard tube with a hollow inner volume and at least one surface coating. The sandpaper cartridge is removably installable on the post which is coupled to the substantially flat base.

A kit is embodied herein for the Clawminator system comprising: at least one replaceable sandpaper cartridge, a user instruction manual, and a cat claw trimming and exercise device as described herein.

In accordance with the embodiments of the present invention a preferred method of use is also disclosed herein comprising: inserting and securing a replaceable sandpaper cartridge onto a vertical post of a cat claw trimming and exercise device; allowing a cat to use the cat claw trimming and exercise device to abrasively manicure the cat's claws while permitting the cat to simultaneously exercise; and replacing the sandpaper cartridge at an appropriate interval and replacing it with a new sandpaper cartridge.

The present invention holds significant improvements and serves as a clawminator system. These and other features, aspects, and advantages of the present invention will become better understood with reference to the following drawings and description.

BRIEF DESCRIPTION OF THE DRAWINGS

The figures which accompany the written portion of this specification illustrate embodiments and method(s) of use for the present invention, Clawminator, constructed and operative according to the teachings of the present invention.

The various embodiments of the present invention will hereinafter be described in conjunction with the appended drawings, wherein like designations denote like elements.

DETAILED DESCRIPTION

Figure 1:
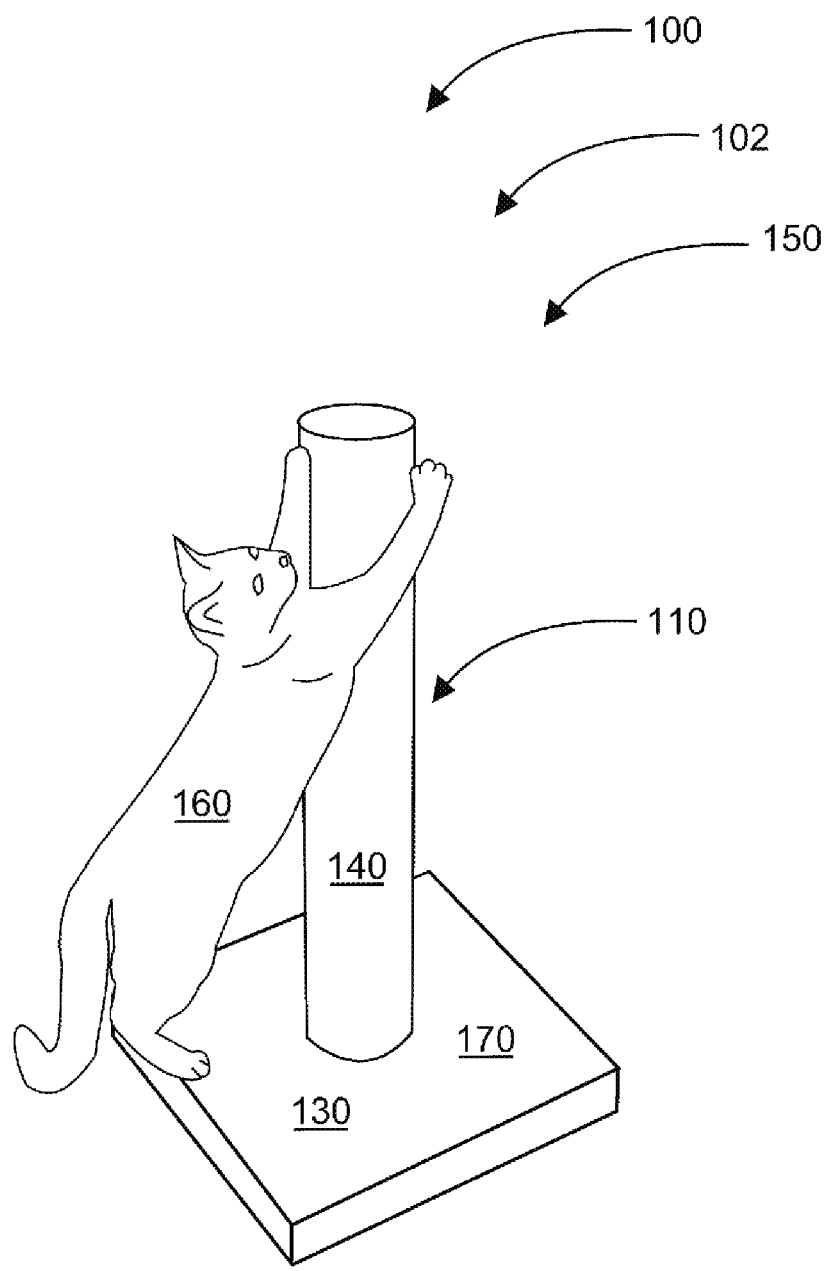
FIG. 1 shows a perspective view illustrating Clawminator systems in an in-use condition according to an embodiment of the present invention.

As discussed above, embodiments of the present invention relate to a scratching post device and more particularly to a Clawminator as used to improve the claw trimming and exercising for indoor cats. Referring to the drawings by numerals of reference there is shown in FIG. 1, a perspective view illustrating Clawminator systems 100 in an in-use condition 150 according to an embodiment of the present invention.

Cat claw trimming and exercise device 110, of Clawminator systems 100 of the present invention is disclosed herein preferably comprising: at least one post 120; a flat base 130; at least one sandpaper cartridge 140; wherein sandpaper cartridge 140 is removably installable on post 120, forming Clawminator assembly 102. Post 120 is removably couplable to base 130 to create in-use condition 150, as shown in the present figure.

Post 120 within this particular embodiment comprises a substantial vertically orientation in relation to a substrate such as a floor, ground or other suitable surface. The orientation shown herein comprises a perpendicular angle relative to the substrate allowing cat 160 to perform at least one claw trimming and exercising routine in a substantially comfortable, stable and natural position. In this way post 120 permits cat 160 to physically exercise both its legs and trim its claws simultaneously in a natural and comfortable position. It should be understood that post 120 may be mounted at an angle less than 90 degrees, be adjustable or may be mounted horizontally in certain applications.

Post 120 is removably coupled to flat base 130, wherein flat base 130 is located adjacent the substrate and post 120 is thereby effectively supported and stabilized upwardly. Base 130 provides a large surface area for cat 160 to use as a stable balancing surface for his/her haunches. Base 130 comprises at least one textured surface 170. Textured surface 170 comprises gripping means whereby cat 160 may be stabilized by digging in their claws for traction. In this way textured surface 170 of cat claw trimming and exercise device 110 permits cat(s) 160 to comfortably stabilize them using their back legs while claw trimming and exercising.

The preferred post 120 used within the present invention comprises wood, is approximately 60-90 cm (24-36 inches) tall, and may be covered in rough fabric or sisal. Post 120 is typically mounted vertically, as shown on a wide base 130, which allows cat 160 to stretch upwardly on its rear haunches/legs and scratch freely without tipping cat claw trimming and exercise device 110 over. It should be appreciated that post 120 if unstable does not allow cat 160 to fully extend its body thus rendering the device undesirable for use by cat 160. It is desirable that the present invention be enticing to cat 160 to promote its use and to save damage to furniture and other interior items that may be damaged by clawing. Further, it is desirable that cat 160 use cat claw trimming and exercise device 110 to promote healthy exercise regimens on a regular basis, thereby developing and maintaining muscle tone. In this way the present invention serves to soothe cats 160 and promotes their healthy well-being.

Surfaces and surface coatings 142 may vary for cat claw trimming and exercise device 110. Post 120, or sandpaper cartridge 140 in certain other embodiments may be covered in sisal rope, upholstery fabric, or the jute backing of a piece of carpet, depending on pet preference. Many pet owners find they have to experiment with different surfaces to find one that their cats 160 will scratch reliably. Cats 160 may prefer sisal or corrugated cardboard surfaces; however it is desirable that friction-abrasive surface 144 be made available to promote filing of claws via sanding. Tubes of hollow cartridges, which may be made with cardboard covered in friction-abrasive surface 144 (sandpaper) are preferably used in the invention described herein. In this way owners are effectively reduced from having to manually trim claws of cat 160, a potentially undesirable and harmful process/event for the pet owner and the pet. Clawminator systems 100 serves to effectively and efficiently file cats' 160 claws. Further, Clawminator systems 100 may comprise a single tier cat claw trimming and exercise device 110 or in different embodiment include more than one tier.

Figure 2:
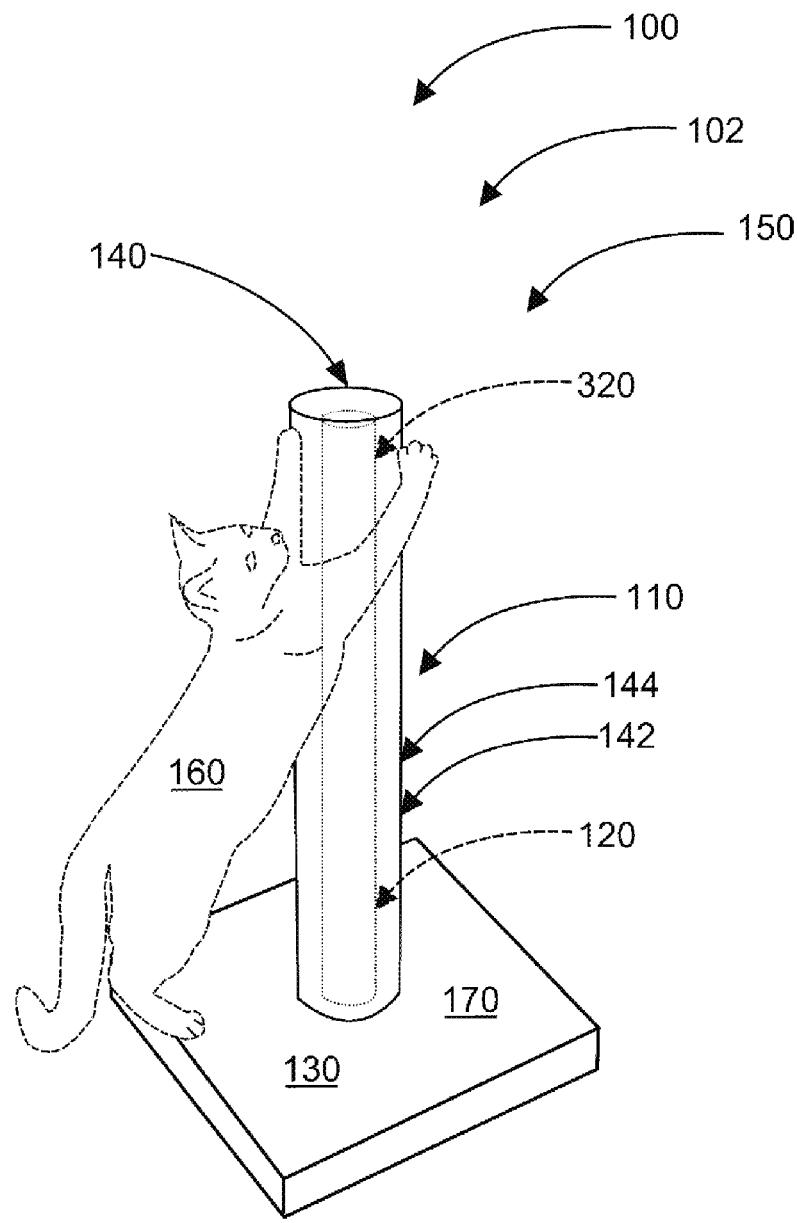
FIG. 2 is a perspective view illustrating a post attached to a flat base according to an embodiment of the present invention of FIG. 1.
Figure 3:
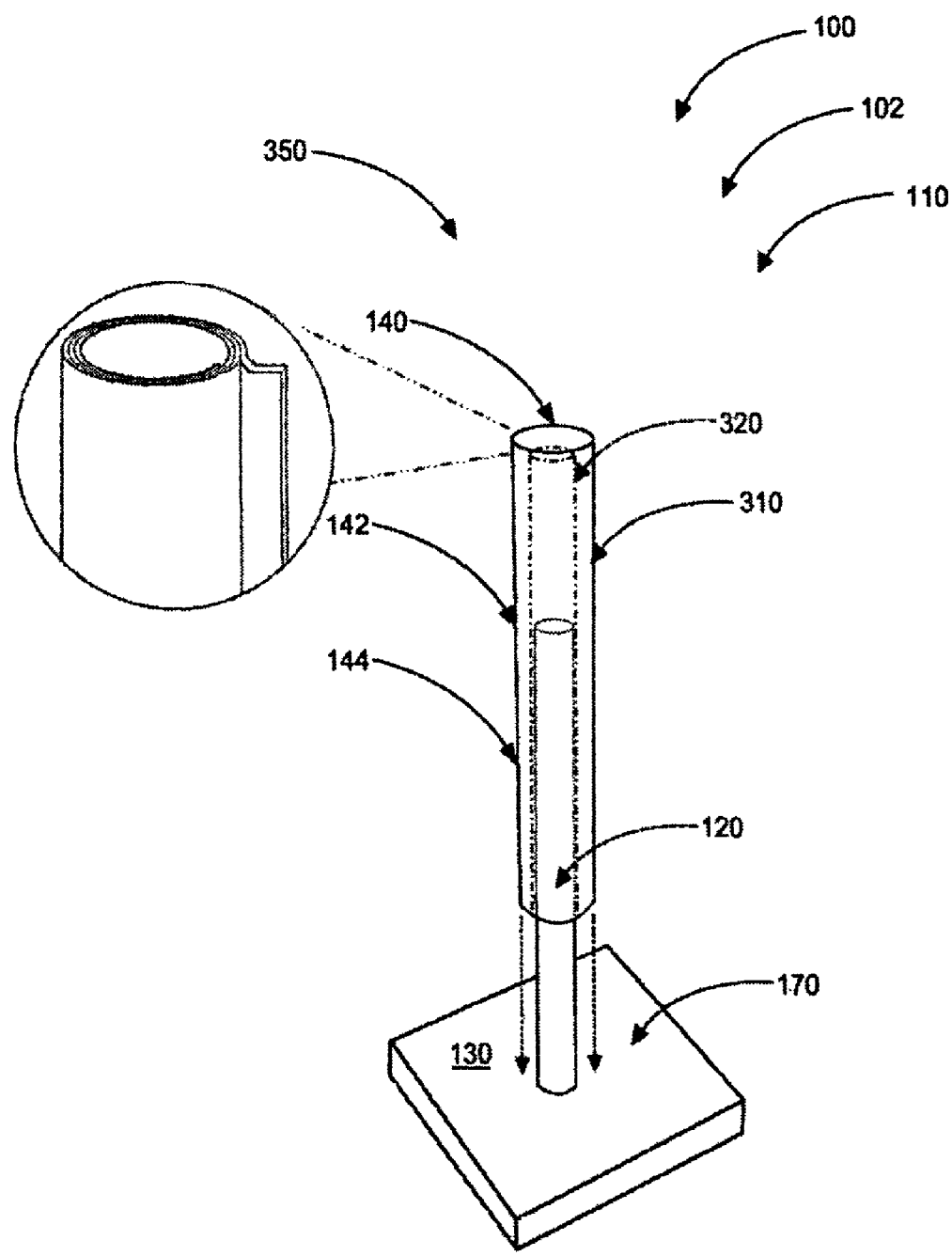
FIG. 3 is an exploded view illustrating a removable sandpaper cartridge according to an embodiment of the present invention of FIG. 1.

Referring now to FIGS. 2 and 3, respectively, a perspective view illustrating post 120 attached to flat base 130, and an exploded view illustrating a removable sandpaper cartridge 140 used in Clawminator assembly 102, according to an embodiment of the present invention of FIG. 1.

As described previously Clawminator assembly 102 preferably comprises post 120, base 130, and sandpaper cartridge 140. Sandpaper cartridge 140 within the particular embodiment shown comprises a removable cardboard tube 310 comprising hollow inner volume 320 permitting its removable installation over outer volume of post 120, as illustrated in the exploded view of Clawminator assembly 102 of FIG. 3. It may be preferable to have hollow inner volume 320 and outer volume of post 120 in a friction-fit relationship, thereby adequately securing Clawminator assembly 102 together. In the present embodiment cardboard tube 310 further comprises an adhesive finish with at least one surface coating 142. Surface coating 142 may comprise a friction-abrasive surface 144 such as sandpaper, suitable for filing and trimming claws of cat 160. Surface coating 142 comprising friction-abrasive surface 144 is preferably integral in this particular embodiment of the present invention. Surface coating 142 comprises a friction-abrasive surface suitable for filing and trimming claws of cat 160.

In other embodiments of Clawminator systems 100, sandpaper cartridge 140 may comprise at least one removable sheet (not shown) removably secured to cardboard tube 310 via adhesive or fastening means such as Velcro®, clips or other suitable securing means. Sheets of sandpaper may comprise grits similar to those used in sandpaper cartridge 140 using friction-abrasive surface 144. In certain cases it may be desirable to change sheet grit in instances where cat 160 may need coarser or finer grit to suitably manicure their claws. Accordingly, the present invention may be offered for sale with different abrasives and/or grits.

Clawminator systems 100 may further comprise kit 350 including a plurality of replaceable sandpaper cartridges 140, a user instruction manual, and cat claw trimming and exercise device 110. Further, the present invention may be sold as Clawminator assembly 102 ready for use in in-use condition 150 or disassembled for ease of shipping. Sandpaper cartridges 140 may be sold separately and may comprise different grits/abrasives or textures. Further, Clawminator systems 100 may be sold in various heights to accommodate varying sizes of cats 160. Textured surface 170 may also comprise different materials and profiles in different versions of kit 350.

Cat claw trimming and exercise device 110 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 4:
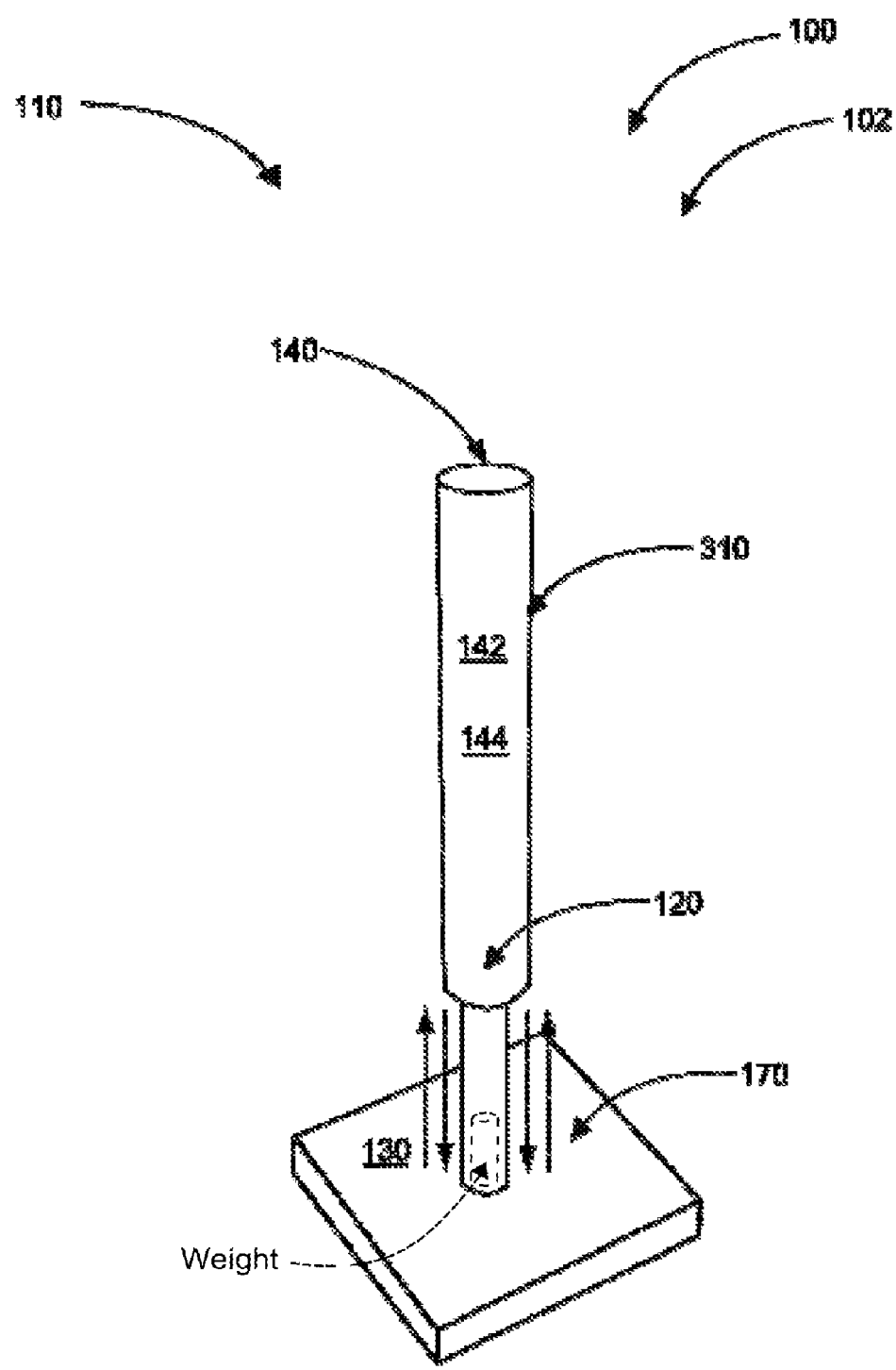
FIG. 4 is a perspective view illustrating the Clawminator assembly according to an embodiment of the present invention of FIG. 1.

Referring now to FIG. 4, a perspective view illustrating Clawminator assembly 102 according to an embodiment of the present invention of FIG. 1.

Clawminator systems 100 of the present invention effectively and efficiently allows cats 160 to safely, independently, and naturally file, trim, and dull their claws. The invention, as previously mentioned may comprise post 120 and connected base 130, which may be made of resin or other suitable material. Post 120 may be disconnected from base 130 to remove and/or install sandpaper cartridge 140 or sandpaper cartridge 140 may be inserted directed overtop post 120. In certain embodiments, sandpaper cartridge 140 may be coupled to post 120 and/or base 130.

Base 130 may be approximately 19" tall and 19" wide, and may include a textured surface 170 to help cats 160 stabilize themselves as mentioned previously while using post 120. Base 130 may comprise weighting means in certain embodiments to add extra stability by increasing the mass at the center of gravity. Base(s) 130 may also be secured to the floor or other substrate for aggressive cats 160. Tubes of hollow sandpaper cartridges 140, which may comprise cardboard covered in sandpaper, may be included to fit over the top of post 120. Post 120 may be approximately 32" tall while sandpaper cartridge 140 may be 6" in diameter, however it should be appreciated that other heights and diameters will fall within the scope and spirit of the invention as described herein, and that any references to sizes, heights, weights are exemplary, and are not to be construed as limiting in any way. Sandpaper cartridge 140 may be easily replaced after becoming worn down, (as illustrated in FIG. 3) thereby increasing the cost-effectiveness and lifespan of such cat claw trimming and exercise devices 110. Cat claw trimming and exercise device 110 be made available in natural colors, such as tan or beige or other colors and/or configurations.

Figure 5:
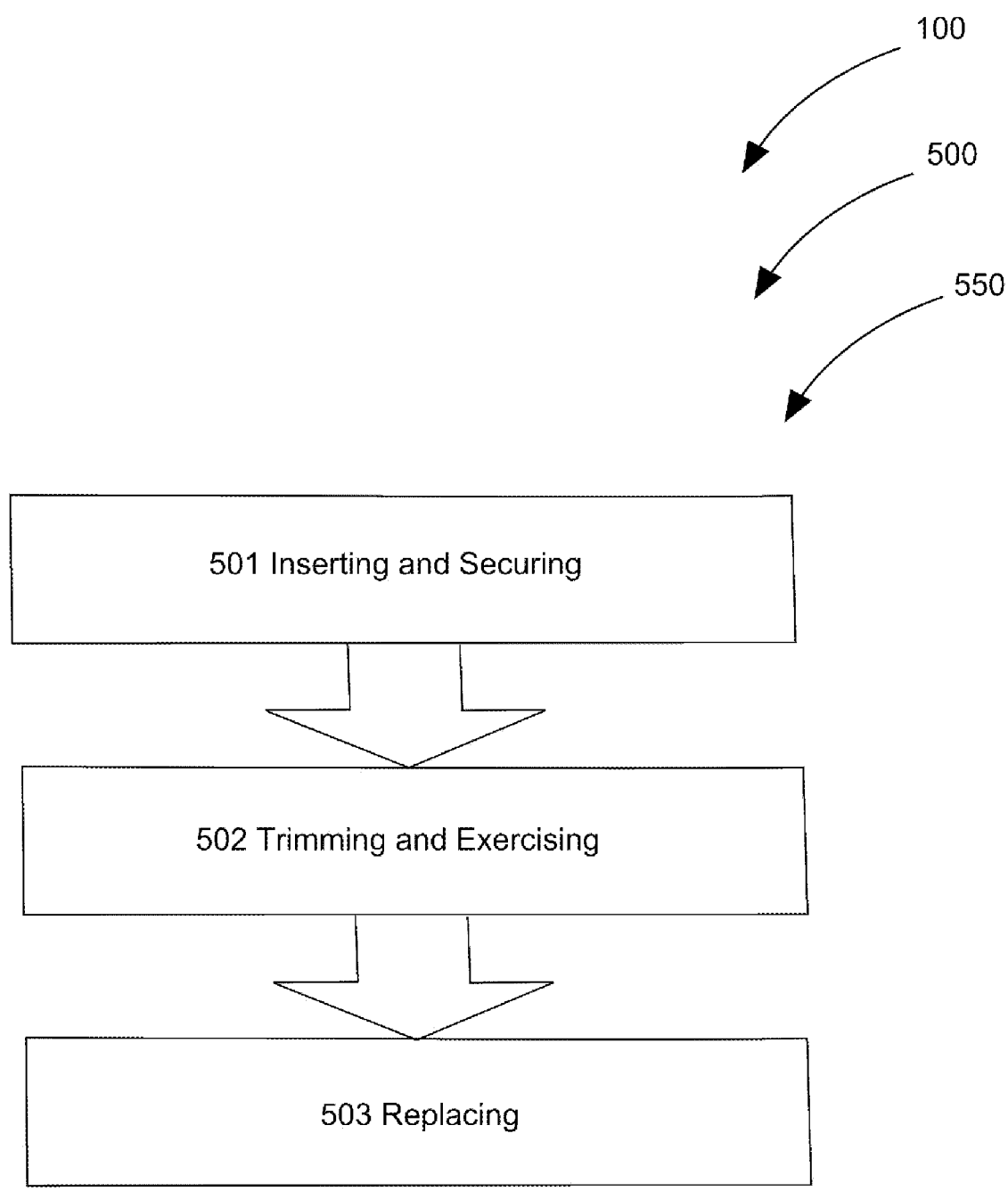
FIG. 5 is a flowchart illustrating a method of use according to an embodiment of the present invention of FIGS. 1-4.

Referring now to FIG. 5, showing flowchart 550 illustrating a method of use 500 according to an embodiment of the present invention of FIGS. 1-4.

In accordance with the embodiments of the present invention a preferred method of use 500 is disclosed herein comprising the following steps: step one 501 inserting and securing a replaceable sandpaper cartridge 140 onto a vertical post 120 of cat claw trimming and exercise device 110; step two 502 allowing at least one cat 160 to use cat claw trimming and exercise device 110 to abrasively manicure the cat's claws while permitting cat 160 to simultaneously exercise; and step three 503 replacing sandpaper cartridge 140 at an appropriate interval (such as when abrasive is substantially worn).

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cat claw trimming and exercise device comprising:
    a) at least one post;
    b) a flat base;
    c) at least one sandpaper cartridge;
    d) wherein said sandpaper cartridge is removably installable on said post which is coupled to said flat base;
    e) wherein said sandpaper cartridge comprises a hollow inner volume;
    f) wherein said sandpaper cartridge comprises a removable cardboard tube; and
    g) wherein the flat base comprises at least one textured surface whereby said textured surface permits a cat to stabilize itself using its back legs while claw trimming and exercising.

2. The cat claw trimming and exercise device of claim 1 wherein said post is vertically oriented in relation to a substrate.

3. The cat claw trimming and exercise device of claim 1 wherein said cardboard tube further comprises an adhesive finish with at least one surface coating, and the surface coating comprises a sandpaper.

4. The cat claw trimming and exercise device of claim 3 wherein said sandpaper surface coating comprises a friction-abrasive surface suitable for filing and trimming said cat's claws.

5. The cat claw trimming and exercise device of claim 1 wherein said sandpaper cartridge comprises at least one removable sheet secured to said cardboard tube via adhesive means.

6. The cat claw trimming and exercise device of claim 1 wherein said post permits said cat to physically exercise both its legs and trim its claws simultaneously.

7. A cat claw trimming and exercise device comprising:
    a) a vertical post;
    b) a weight
        i) wherein said weight increases mass at the center of gravity of the cat claw trimming and exercise device;
    c) a flat base having a textured surface permitting at least the one cat to stabilize itself using its back legs while performing said claw trimming and exercising; and
    d) at least one sandpaper cartridge having
        i) a cardboard tube with a hollow inner volume and
        ii) at least one surface coating,
    e) wherein said sandpaper cartridge is removably installable on said post which is coupled to said flat base.

8. The cat claw trimming and exercise device of claim 7 wherein said surface coating comprises a friction-abrasive surface suitable for filing and trimming said cat's claws.

9. The cat claw trimming and exercise device of claim 7 wherein said sandpaper cartridge comprises at least one removable sheet secured to said cardboard tube via adhesive means.

10. The cat claw trimming and exercise device of claim 7 wherein said cat claw trimming and exercise device further comprises a kit including said at least one replaceable sandpaper cartridge, a user instruction manual, and said cat claw trimming and exercise device.

* * * * *